United States Patent [19]
Kapstad

[11] Patent Number: 4,661,392
[45] Date of Patent: Apr. 28, 1987

[54] SOUND DAMPENING PANEL AND METHOD OF FABRICATION

[76] Inventor: Odd B. Kapstad, 5 Minot Ave., Acton, Mass. 01720

[21] Appl. No.: 779,943

[22] Filed: Sep. 25, 1985

[51] Int. Cl.⁴ .................... B32B 3/28; B32B 17/06
[52] U.S. Cl. .................................... 428/182; 156/210; 156/229; 156/308.2; 181/290; 181/294; 181/296; 428/186; 428/218; 428/920
[58] Field of Search ............ 428/182, 186, 920, 218; 181/284, 290, 294, 296; 156/210, 229, 308.2

[56] References Cited
U.S. PATENT DOCUMENTS

| | | | |
|---|---|---|---|
| 1,925,453 | 9/1933 | Mazer | 154/45 |
| 2,198,885 | 4/1940 | Price | 181/290 |
| 2,419,971 | 5/1947 | Rumpf et al. | 181/290 |
| 2,902,854 | 9/1959 | Greene | 72/68 |
| 2,973,295 | 2/1961 | Rodgers, Jr. | 428/182 |
| 3,115,948 | 12/1963 | Gildard, III et al. | 181/33 |
| 3,247,928 | 4/1966 | Poncet | 181/33 |
| 4,362,222 | 12/1982 | Hellstrom | 181/287 |
| 4,441,581 | 4/1984 | Sommerhalder | 181/286 |
| 4,522,284 | 6/1985 | Fearon et al. | 181/294 |
| 4,531,609 | 7/1985 | Wolf et al. | 428/182 |
| 4,539,252 | 9/1985 | Franz | 181/294 |

FOREIGN PATENT DOCUMENTS

| | | | |
|---|---|---|---|
| 222770 | 2/1958 | Australia . | |
| 58-177742 | 10/1983 | Japan | 428/186 |
| 432239 | 7/1935 | United Kingdom . | |

*Primary Examiner*—Paul J. Thibodeau
*Attorney, Agent, or Firm*—Hamilton, Brook, Smith & Reynolds

[57] ABSTRACT

A sound dampening panel comprises a corrugated center barrier sandwiched between fibrous sound dampening material which is covered with fabric. The fibrous material fills the spaces between corrugations and forms a layer over the corrugations. In one form of panel the fibrous material is thermally fused under pressure such that it is rigidly formed with a relatively low density in the spaces between the corrugations and with a relatively high density in the layer over the corrugations. The fibrous material is also thermally bonded to the center barrier. In another form of panel, inserts of one density are placed in the spaces between corrugatins and those inserts are covered by a layer of greater density which is glued to ridges of the corrugations.

28 Claims, 7 Drawing Figures

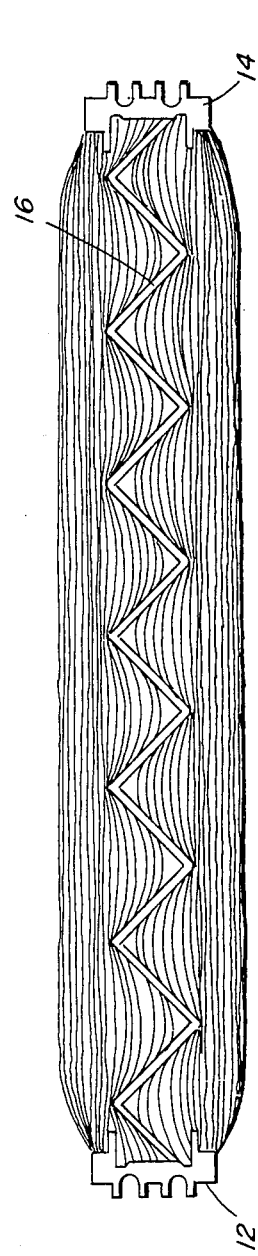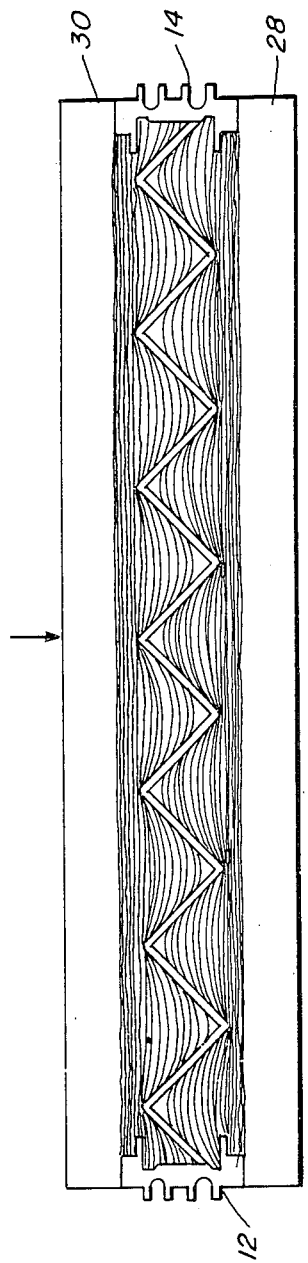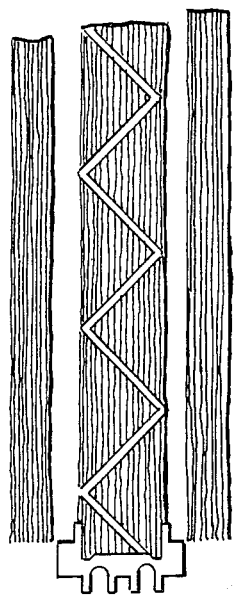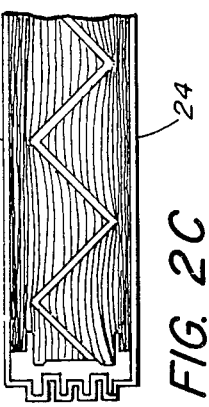

SOUND DAMPENING PANEL AND METHOD OF FABRICATION

DESCRIPTION

Background

Freestanding panels are often used to subdivide large rooms into individual offices and work stations. To provide speech privacy between persons separated by the partitioning panels, the panels must be constructed to prevent sound from penetrating the panel. Also, the panel must be able to dampen sound to prevent reflection of the sound back into the workspace from which it originates or from being reflected through doorways and the like to other workspaces.

Sound absorption is generally obtained with the use of several layers of sound dampening material such as fibrous batts. A center layer of steel, hardboard or other high density material provides structural strength as well as a barrier to the penetration of sound. Each face of the panel is best covered with fabric or other material which does not reflect the sound but which allows the sound to penetrate into the dampening material. The entire structure is supported by a surrounding frame.

Corrugated center barriers have been suggested for use in sound dampening panels. Such barriers add to the rigidity of the assembly and further contribute to the sound dampening characteristics of the panel by reflecting sound through greater path lengths through the sound dampening material.

It is generally accepted that a thicker panel provides better sound dampening results. However, from a cost standpoint, with respect to construction costs and the cost of space, it is important to keep the thickness of the partition to a minimum. Specifications for partitions often specify the thickness of the surrounding frame and the sound dampening characteristics of the partition. In order to meet both specifications, manufacturers often stuff a large amount of sound dampening material behind the fabric which spans a specified narrow frame with the result of a bulge in the center of the partition. The large amount of dampening material may even sag toward the floor. Such results are both aesthetically displeasing and wastefull of space.

DISCLOSURE OF THE INVENTION

A sound dampening panel includes a corrugated center barrier sandwiched between fibrous sound dampening material. A triangular corrugation is preferred. The fibrous material fills the spaces between the corrugations to each side of the center barrier and forms a layer over the corrugations. The fibrous sound dampening material is preferably covered with fabric to complete the assembly. Preferably, the material in the space between the corrugations is of a lower density than the material covering the corrugations. For example, the material in the spaces between the corrugations may be fiberglass of a density within the range of 3 to 5 pounds per cubic foot and the layer over the corrugations may be of fiberglass having a density within the range of 5 to 10 pounds per cubic foot.

In a preferred method of manufacturing the panel, preformed inserts shaped to fill the spaces between the corrugations are placed in those spaces. The corrugations and inserts are then covered with a separate sheet of material which is glued to the ridges of the corrugations. Because the outer layer, which is securely glued to the ridges of the corrugations, is substantially less in thickness than the total thickness of the fiberglass, sagging is prevented.

In another form, the fibrous material is fused under pressure such that it is rigidly formed with a relatively low density in the spaces between the corrugations and with a relatively high density in the layer over the corrugations. The fibrous material may also be bonded to the corrugated panel in the forming process. The rigidity of the fibrous material prevents bulging or sagging. Both the corrugated center panel and rigid fibrous material further add to the structural integrity of the overall panel. The fibrous material may be fiberglass and the corrugated barrier may be of metal such as steel. Flat fiberglass batts may be pressed into the spaces between corrugations, or the insulation may be preformed to the shape of the corrugation spaces. The fibrous material may be pressed into the fused rigid structure in a heated press with a width-determining frame already positioned around the panel.

DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A-C illustrates the manufacturing process for forming the panel of FIG. 1;

FIG. 3 illustrates the first step of an alternative method of forming the panel of FIG. 1;

DESCRIPTION OF PREFERRED EMBODIMENTS

Figure 1:
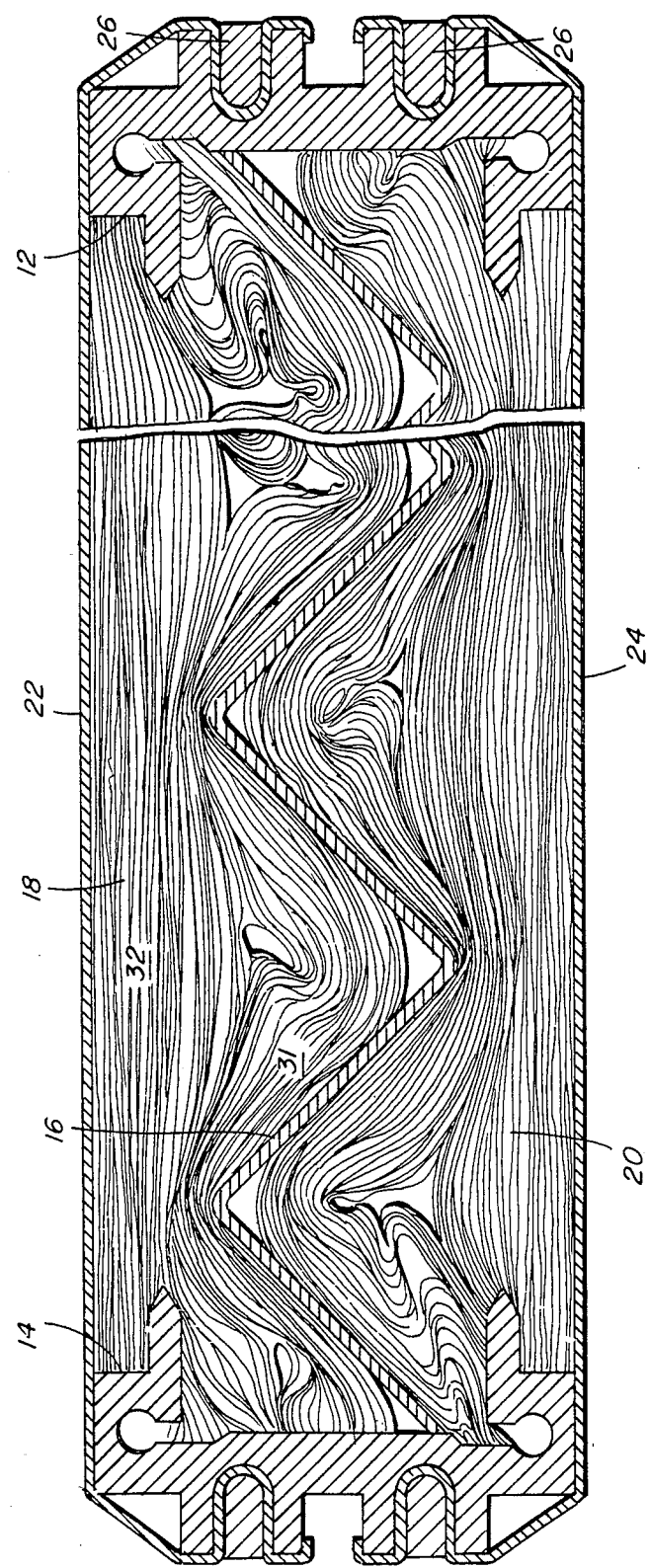
FIG. 1 illustrates a preferred embodiment of the present invention.

A cross sectional view of a panel embodying the present invention is illustrated in FIG. 1. The panel includes a rectangular frame including elements 12 and 14 which are of conventional structure. The rectangular frame is typically spanned by a flat sheet of high density material such as metal or hardboard. In the present panel, however, that center barrier 16 is corrugated. Fibrous sound dampening material 18 and 20 is provided on either side of the center barrier 16. That fibrous material is covered with fabric 22 and 24 which permits sound to pass therethrough into the sound dampening material. The fabric 22 and 24 is stretched over the frame elements and retained by splines 26. The frame, including elements 12 and 14, is typically covered with a finishing frame which is not shown.

The corrugated center barrier reflects sound within the panel and thus results in the sound travelling greater distances through sound dampening material. The sound may be reflected several times in many directions. A significant test in characterizing sound dampening partitions is to direct sound at the panel at an angle and to measure the amount of sound reflected away from the source but to the same side of the panel. It will be recognized that sound which is angled into the panel is likely to be reflected more toward the source, again through a length of sound dampening material. Further, the corrugated shape makes the barrier more stiff so that it is less likely to start vibrating at frequencies at which flat barriers will typically vibrate. The corrugations of the center barrier also serve major functions in the fabrication processes described below which determine the ultimate nature of the fibrous material on either side of the center barrier.

One manufacturing process is illustrated is FIGS. 2A-C. As shown in FIG. 2A, the center corrugated barrier is joined to the frame elements, and a layer of fibrous material such as fiberglass is provided on each side of the center barrier and pressed into the corrugation spaces. A suitable fiberglass material is that sold by Owens-Corning for sound and thermal insulation. The total thickness of the fiberglass batts placed over the center panel is significantly greater than the thickness of the frame, preferably by about 10% to 50%.

The fiberglass is then compacted by a flat press having a base 28 and press member 30 as shown in FIG. 2B. During this operation, heat is applied to the press elements. As a result, the fiberglass or a binder thereon is melted and the fiberglass material is fused into the flat form of FIG. 2B. Fusion of the fibrous material results in a relatively rigid fibrous structure which is bonded to the center panel 16. The rigidity of the structure prevents bulging and sagging of the sound dampening material after the press is removed.

Due in part to the corrugated center barrier, the fibrous material is not compacted uniformly across the width of the overall panel. Rather, the material within the spaces 31 between the corrugations is protected by the corrugations from compaction with the result that the material in the spaces 31 is of a relatively low density as illustrated in FIG. 1. However, there is a relatively high density layer 32 over the corrugations where the fibrous material is compressed and simultaneously fused. The dual densities of the sound dampening material result in better absorption of a wider range of sound frequencies. The thicknesses of the layer 32 and the material in the spaces 31 should be of about the same order; that is, the thickness of the layer 32 should be in range of about 50% to 150% of the thickness of the space 31 between the corrugations.

Once the assembly, with its rigid dual density fibrous dampening material is removed from the press, it is covered in the conventional manner with fabric 22, 24 as in FIG. 2C.

In the method of FIGS. 2A-C the fibrous material is pressed into the spaces between the corrugations but is protected by the corrugations from further compaction by the press to provide lower density regions. In an alternative approach, spaces between the corrugations are filled with triangular cross section inserts as illustrated in FIG. 3. Those inserts are covered with a flat layer of fibrous sound dampening material. Alternatively, inserts can be cut directly into a thick batt of material. When the assembly is then compressed in the heated press as in FIG. 2B, lower density regions are again formed between the corrugations. Those regions are of more uniform density because fibrous material is not initially pressed into the spaces between corrugations.

Figure 4:
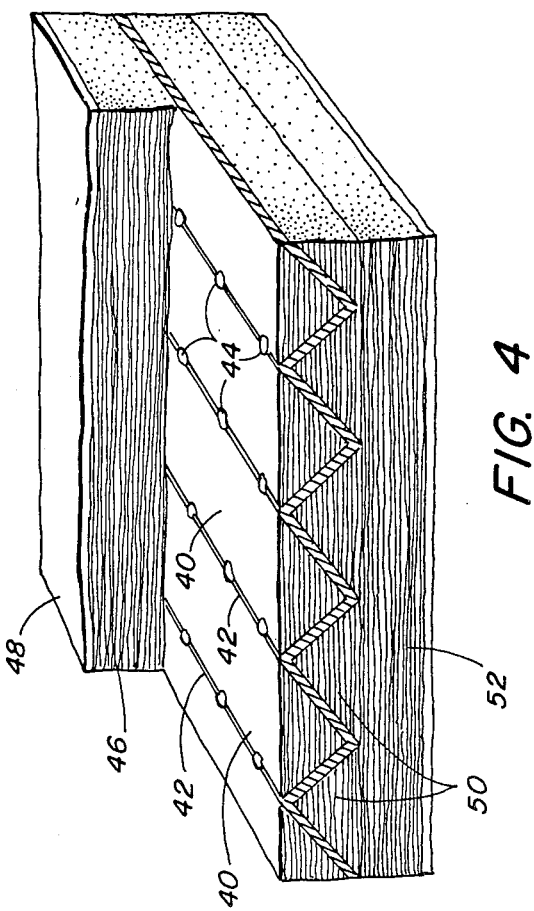
FIG. 4 illustrates an alternative embodiment of the invention.

An alternative embodiment of the invention based on a modified fabrication technique is illustrated in FIG. 4. The modified technique avoids the need for a hot press but still provides for dual density insulation with a substantial thickness yet without sagging. In this approach, preformed inserts 40 having a triangular cross section to match the space between corrugations are set in those spaces. Preferably, the inserts have a density within the range of about 3-5 pounds per cubic foot. Glue is then applied to the exposed ridges 42 of the corrugations. The glue may be applied as a continuous bead but is shown as discrete spots 44. A layer 46 of greater density, preferably within the range of 5-10 pounds per cubic foot, is then laid over the inserts 40 and the corrugation. With the layer 46 securely glued to the ridges 42, the inserts 40 are held in place. The distance between the fabric 48 and the glued joint is substantially less than the combined thickness of the outer layer and the inserts; thus, the outer layer is sufficiently thin so as not to suffer excessive sagging. The opposite side of the panel is similarly formed with inserts 50 and a layer 52 glued to the ridges of the corrugation.

Figure 5:
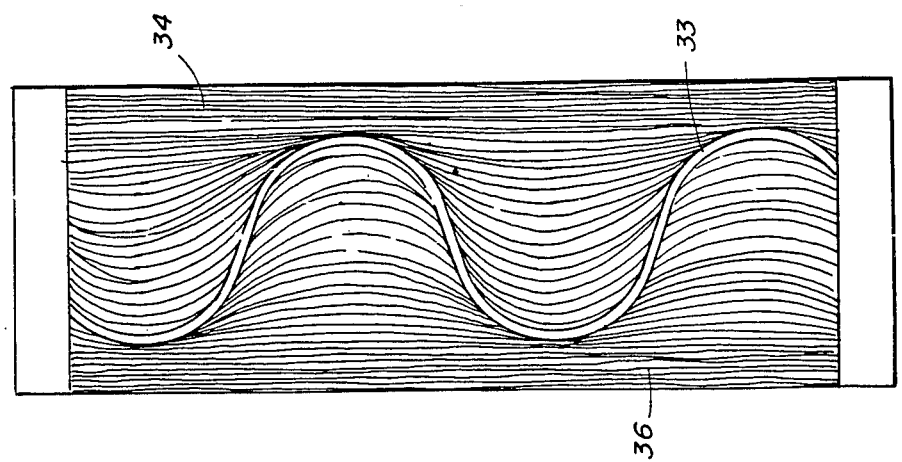

Another embodiment of the invention is illustrated in FIG. 5. In this embodiment, the center corrugated barrier 3 has sinusoidal corrugations rather than the triangular corrugations of the previous embodiments. Fibrous material 34 and 36 is again provided on both sides of the corrugated center barrier. Preformed inserts and covering layers of different densities may be provided as before. Alternatively, the material may be fused in a heated press to form lower density regions between the corrugations and higher density layers over the corrugations. As in previous embodiments, this corrugated center barrier adds to the rigidity of the partition and facilitates the forming of the fibrous material into dual densities. However, its sound reflection characteristics are less desirable than those of the triangularly corrugated barrier.

While the invention has been particularly shown and described with reference to preferred embodiments thereof, it will be understood by those skilled in the art that various changes in form and details may be made therein without departing from the spirit and scope of the invention as defined by the appended claims.

I claim:

1. A sound dampening panel comprising a rigid corrugated center sound barrier sandwiched between fibrous sound dampening material, the fibrous material to each side of the corrugated barrier filling the spaces between the corrugations and forming a layer over the corrugations, the fibrous material in the layer over the corrugations having a density different from the density of the material between the corrugations.

2. A sound dampening panel as claimed in claim 1 further comprising a fabric layer covering the fibrous sound dampening material to each side of the barrier.

3. A sound dampening panel as claimed in claim 1 wherein the fibrous material has been fused under pressure such that it is rigidly formed with a relatively low density in the spaces between the corrugations and with a relatively high density in the layer over the corrugations.

4. A sound dampening panel as claimed in claim 3 wherein the fibrous material is thermally fused and bonded to the center barrier.

5. A sound dampening panel as claimed in claim 1 wherein the fibrous sound dampening material comprises fiberglass.

6. A sound dampening panel as claimed in claim 1 wherein the center barrier is metal.

7. A sound dampening panel as claimed in claim 1 wherein the center barrier has triangular corrugations.

8. A sound dampening panel as claimed in claim 1 wherein the fibrous material in the spaces between the corrugations is preformed to the shape of the spaces.

9. A sound dampening panel as claimed in claim 8 wherein preformed inserts of a first density are positioned in the spaces between the corrugations, and the inserts and corrugations are covered by a separate layer of material of a second density.

10. A sound dampening panel as claimed in claim 9 wherein the separate layer of material covering the corrugations is glued to the ridges of the corrugations.

11. A sound dampening panel as claimed in claim 1 wherein the fibrous material in the spaces between the corrugations and forming a layer over the corrugations is formed from a flat batt of material pressed into the spaces between corrugations.

12. A sound dampening panel as claimed in claim 1 wherein the material in the spaces between the corrugations is fiberglass having a density within the range of about 3-5 pounds per cubic foot and the material in the layer over the corrugations is fiberglass having a density within the range of about 5-10 pounds per cubic foot.

13. A sound dampening panel comprising a rigid triangularly corrugated center sound barrier, preformed inserts of fiberglass material of triangular cross section having a first density filling the spaces between the corrugations, a separate layer of fibrous material having a second density glued to the ridges of the corrugated barrier, and fabric secured over the layer of fibrous material.

14. A sound dampening panel as claimed in claim 13 wherein the preformed inserts have a density less than the density of the layer covering the corrugations.

15. A sound dampening panel as claimed in claim 14 wherein the preformed inserts are fiberglass of about 3-5 pounds per cubic foot and the material in the layer over the corrugations is fiberglass of about 5-10 pounds per cubic foot.

16. A sound dampening panel comprising a rigid triangularly corrugated center sound barrier sandwiched between sound dampening fiberglass, the fiberglass to each side of the corrugated barrier filling the spaces between the corrugations and forming a layer over the corrugations, the fiberglass having been thermally fused under pressure such that it is bonded to the corrugated panel and is rigidly formed with a relatively low density in the spaces between the corrugations and with a relatively high density in the layer over the corrugations, the panel further comprising fabric secured over the fiberglass.

17. A sound dampening panel as claimed in claim 16 wherein the fiberglass material in the spaces between the corrugations and forming a layer over the corrugations is formed from a flat batt of material pressed into the spaces between corrugations.

18. A sound dampening panel as claimed in claim 16 wherein the fiberglass material in the spaces between the corrugations is preformed to the shape of the spaces.

19. A method of fabricating a sound dampening panel comprising providing a rigid corrugated center sound barrier, placing preformed inserts of a fibrous material having a first density within the spaces between corrugations, the inserts being shaped to fill the spaces between the corrugations, and gluing a layer of fibrous material having a second density to ridges of the corrugations to cover the corrugations.

20. A method as claimed in claim 19 further comprising step of stretching the fabric over the fiberous material and securing the fabric to cover the fibrous material.

21. A method as claimed in claim 19 wherein the fibrous inserts are fiberglass having a density within the range of about 3-5 pounds per cubic foot and the material in the layer over the corrugations is fiberglass of a density within the range of about 5-10 pounds per cubic foot.

22. A method of fabricating a sound dampening panel comprising providing a layer of fibrous sound dampening material on each side of a rigid corrugated center sound barrier and pressing the fibrous material between flat presses while heating the fibrous material to compact and fuse the fibrous material such that the fibrous material fills the spaces between corrugations of the barrier and forms a dense rigid layer over the corrugations, said rigid layer having a different density than the fibrous material filling the spaces between the corrugations.

23. A method as claimed in claim 22 wherein the fibrous material is thermally bonded to the center barrier.

24. A method as claimed in claim 22 wherein the fibrous material and center barrier are positioned within a surrounding frame prior to being pressed between the flat presses.

25. A method as claimed in claim 22 further comprising the step of stretching fabric over the fibrous material and securing the fabric to cover the fibrous material.

26. A method as claimed in claim 22 wherein the fibrous material comprises fiberglass.

27. A method as claimed in claim 22 wherein the fibrous material is positioned against the center barrier in the form of a flat batt which is pressed between corrugations of the center barrier.

28. A method as claimed in claim 22 wherein the fibrous material is preformed to the shape of the spaces between corrugations.

* * * * *